Nov. 4, 1969

W. W. YOUNGBLOOD 3,475,795

CABLE FASTENING MEANS

Filed May 8, 1967

William W. Youngblood
INVENTOR.

BY Clarence A. O'Brien
and Harvey B. Jacobson
Attorneys

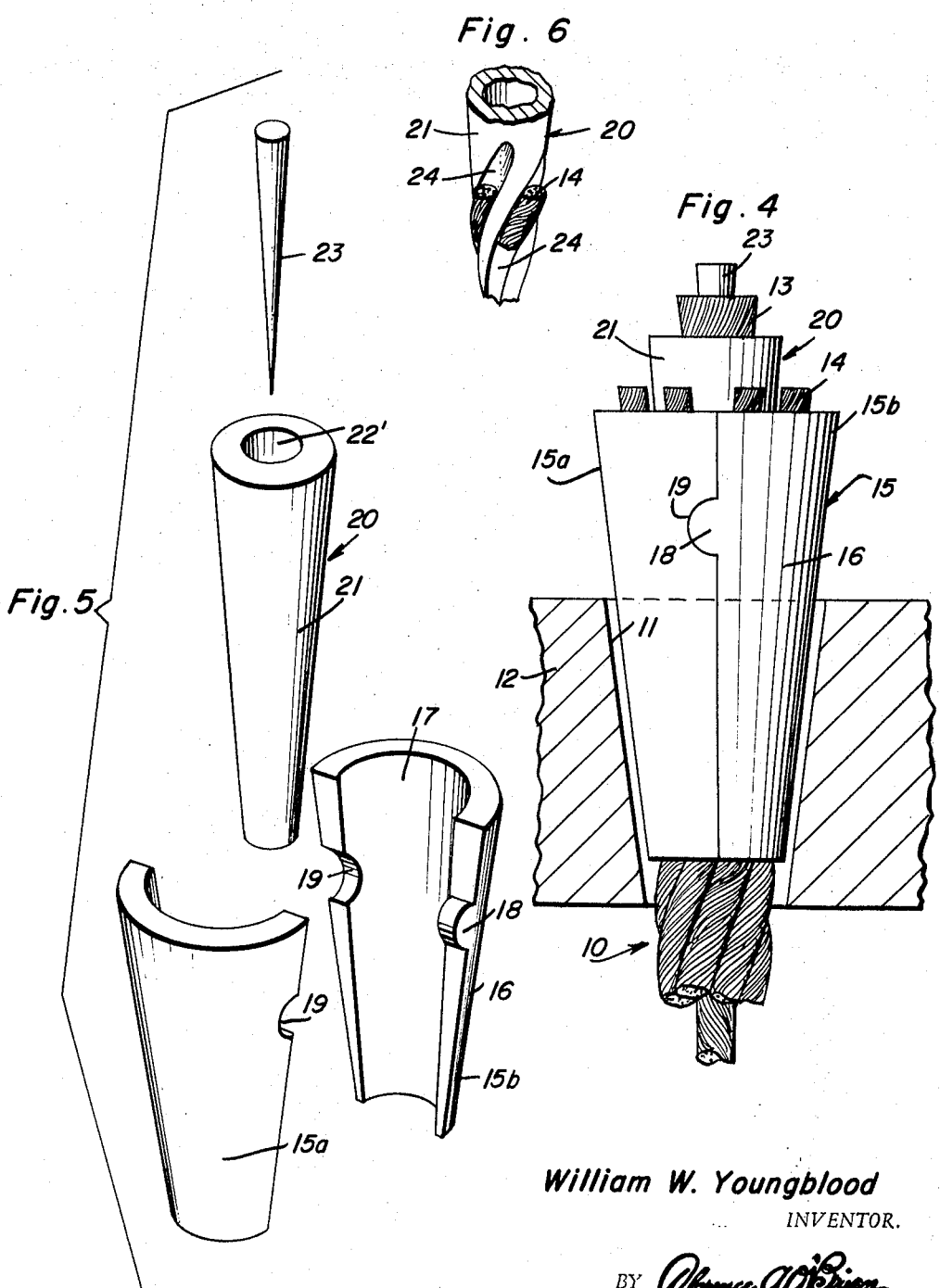

United States Patent Office 3,475,795
Patented Nov. 4, 1969

3,475,795
CABLE FASTENING MEANS
William W. Youngblood, 547 E. Fort St.,
Farmington, Ill. 61531
Filed May 5, 1967, Ser. No. 636,393
Int. Cl. F16g *11/05*
U.S. Cl. 24—122.6                                      4 Claims

ABSTRACT OF THE DISCLOSURE

Means for fastening the end portion of a cable in a frustoconical socket, consisting of a frusto-conical liner inserted in the socket and receiving the cable, a tapered hollow locking plug passed over the cable core and between the core and the surrounding strands so that the strands are wedged between the outer surface of the plug and the inner surface of the liner, and a tapered locking pin inserted in the cable core for wedging the same inside the locking plug.

---

This invention relates to new and useful improvements in devices for fastening the end portion of a wire rope or cable in a socket, and more particularly the invention concerns itself with fastening means for cables of a relatively large diameter, on the order of two inches or more.

One form of conventional fastening means involves the placing of the cable in a socket and pouring molten metal into the socket to that the metal sets around the cable and and firmly holds it in position. This, however, not only is a time-consuming procedure, but it also requires special preparation of the cable by cleaning dirt, grease and other foreign matter therefrom, so that a proper bond between the molten metal and the cable may be obtained.

Another type of conventional fastening means involves the provision of a wedge-type socket in which the cable must be bent and doubled upon itself. While this may be generally satisfactory in the instance of small diameter cables, it is quite impractical where relatively large diameter cables are involved, since bending thereof is difficult and results in cable weakness.

It is, therefore, the principal object of this invention to eliminate the disadvantages of conventional cable fastening means as above outlined, this being attained by the provision of only three simple components by which a cable may be firmly secured in a socket without the use of molten metal and without the necessity of bending the cable, and further without the necessity of preparing the cable as by cleaning dirt or grease therefrom.

Another particularly significant object of the instant invention is to provide a cable fastening means whereby provision is made for securing the core and the strands in what might be considered an independent manner so as to fully utilize the tensile strength of each whereby, as an example, a premature rupturing of the core is prevented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a view, partly in side elevation and partly in section, showing the cable and fastening means of FIGURE 1 being inserted in the socket;

FIGURE 4 is a group perspective view of the various components of the fastening means; and FIGURE 6 is a fragmentary perspective view illustrating the manner in which the locking plug will be swaged upon a tensioning of the cable.

Figure 1:
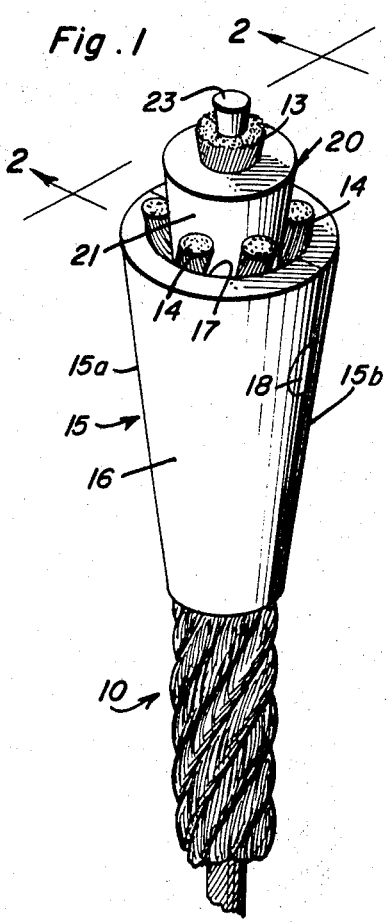
FIGURE 1 is a perspective view showing the components of the fastening means applied to a cable prior to the seating thereof in a socket.
Figure 2:
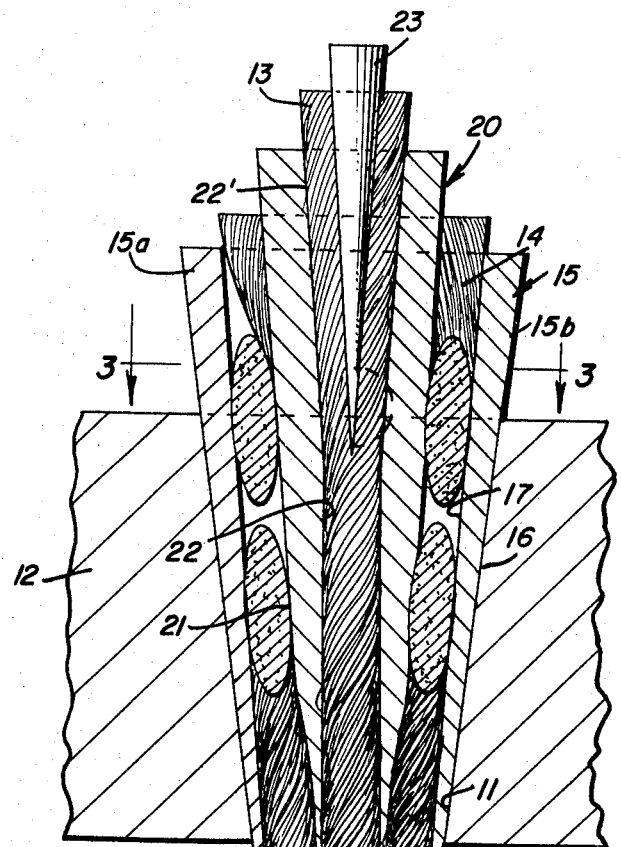
FIGURE 2 is an enlarged, fragmentary sectional view, taken substantially in the plane of the line 2—2 in FIGURE 1 and showing the cable fastened in a socket.
Figure 3:
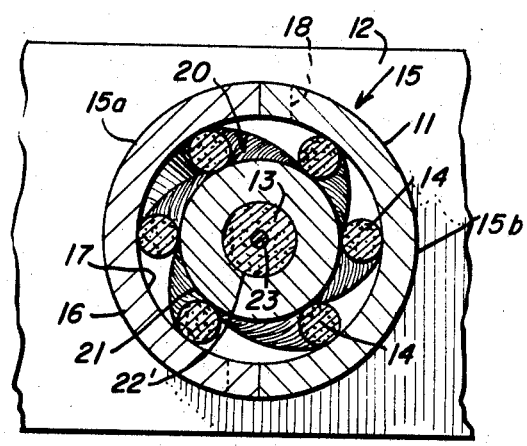
FIGURE 3 is a fragmentary cross-sectional view, taken substantially in the plane of the line 3—3 in FIGURE 2.

Referring now to the accompanying drawings in detail, the reference numeral 10 generally designates a wire rope or cable which may have a diameter on the order of two inches or more, and an end portion of which is to be anchored or secured in an open-ended, frusto-conical bore 11 of a suitable socket 12. As will be apparent, the cable 10 has a central core 13 and a set of strands 14 which are wrapped spirally around the core, in the conventional well-known manner, in either a left-hand lay or a right-hand lay.

The fastening means of the invention includes an open-ended, tapered liner 15 having an outer frustoconical surface 16, tapered at about 1½ in 12, and an inner frusto-conical surface 17, tapered at about ¾ in 12. This lesser taper of the strand engaging inner surface enables the development of more positive and greater wedging pressures, and is also advisable to prevent undesirable separation of the spiral wire rope strands. Further, the inside diameter of the small end of the inner conical surface 17 is to be equal to the diameter of the cable 10.

The liner 15 is adapted to receive an end portion of the cable 10 which is to be fastened. In order to avoid the necessity of passing the liner over the cable, the liner is preferably longitudinally split into a pair of complemental half-sections 15a, 15b, which may be applied to the cable laterally. The abutting split edges of the liner half-sections are preferably provided with interfitting tongues and recesses 18, 19, respectively, whereby to prevent the half-sections from moving longitudinally relative to each other.

The second component of the fastening means comprises a hollow, tapered locking plug 20 having a frusto-conical outer surface 21, tapered at about ⅞ in 12, and a central or axial bore 22 through which the core 13 can be passed without difficulty. The plug 20 is passed over the cable core 13 after the strands 14 have been slightly separated from the core 13, so that the cable core is disposed in the bore 22 of the plug while the plug itself is disposed within the strands 14, as will be clearly apparent from the drawings.

The third component of the fastening means consists of a solid tapered locking pin, having a taper of approximately ⅞ in 12, which is inserted into the end portion of the cable core 13 so as to wedgingly expand the same against the inside of the upper bore portion 22' in the plug 20. It will be noted that while the bore 22 below the locking pin 23 is straight and cylindrical, corresponding generally to the diameter of the cable core 13 while allowing the core to pass therethrough without difficulty, the bore portion 22', constituting approximately the upper one-quarter of the length of the bore 22, is upwardly or outwardly divergent, at a ratio normally of ¾ in 12, for coaction with the tapered locking pin 23 in wedgingly securing the expanded cable core in position.

In the preferred manner of mounting the unit of the instant invention, the split liner 15 is placed about the end portion of the cable or wire rope 10 with the extreme end of the cable 10 projecting above the liner itself. The split liner is then positioned in the bore 11 of the socket 12, after which the narrow end of the locking plug 20 is started over the core 13 between the core 13 and the surrounding strands 14, the plug continuing into the liner so as to effect a conical expansion of the surrounding strands into wedged engagement between the plug 20 and the liner 15. The core 13 is then anchored in the upper tapered bore portion 22' of the plug 20 by means of the locking pin 23 that is driven concentrically into the wires of the core 13. The plug 20 in effect floats freely within the strands 14 and tends to follow the strands in the direction of pull on the cable in that, being free of contact with the liner 15, no frictional resistance to movement of the core 20 developes between the core 20 and the liner 15, this in turn effecting a positive wedging engagement of the confined strands 14 between the plug 20 and the liner 15. Further, in light of the slightly greater external taper of the plug 20 as compared to the internal taper of the liner 15, the annular space therebetween will decrease in width from the small diameter end of the liner and plug to the large diameter end thereof. This is considered particularly significant in that in order to develop the full strength of the cable, it is necessary to have a relatively light wedging and crushing action on the strands where they enter the nose of the socket, along with a progressively greater wedging action toward the ends of the strands. This progressively greater wedging action is achieved by the progressively narrowing space between the plug 20 and the liner 15. In addition, the taper of the lock plug 20 is slight enough so as to provide for a relatively thin wall for a considerable distance inward from the narrow end of the plug 20 whereby the plug 20, being of a relatively soft ductile metal, will in actual practice be swaged inwardly at the thin wall end thereof so as to tightly grip the center core 13 as the cable and plug 20 are pulled under heavy tension down into the liner 15. In this manner, after the cable is put to its full working tension, the core is gripped at the lower end of the assembly, and no longer substantially relies on the lockpin 23 at the top of the plug 20 to hold the tension of the core 13. The nature in which the plug 20 itself will be swaged has been generally indicated in FIGURE 6, this swaging forming spiral grooves 24 within which the strands 14 nest automatically and in a natural position such as could not be achieved with preformed strand receiving grooves.

The fastening means of the instant invention enables a regulation of the load taken by the strands and the core whereby as the strands stretch longitudinally under load, the center core, which is more resistant to elongation, can have a generally free longitudinal movement before it also is firmly and securely gripped to take its portion of the load. This is achieved by setting the lockpin 23 very lightly in the wedging position in the center of the core 13. Thus, the core 13 can move down through the bore of the plug 20 until the heavy working load on the cable produces the swaging action on the lower portion of the plug 20 so as to lock the plug to the central core, at which point the core accepts its portion of the load. It is through this generally independent securing of the strands and core that a premature rupturing of the core is prevented, while at the same time utilizing the full strength of the cable. It should of course be appreciated that even were the tension developed in the strands not sufficient so as to produce the expected swaging of the lower portion of the plug 20, a positive wedging of the core would be achieved between the lockpin 23 and the interior of the plug 20 upon a driving of the pin 23 after the development of an initial tension in the strands.

Another significant feature in providing for a utilization of the full strength of the cable is the manner in which the small end of the liner 15, being of the same diameter as the cable, exerts a positive firm gripping action on the cable so as to hold the spiral strands and center core in their wrapped position immediately adjacent the liner so as to reduce cable wear and fatigue to a minimum in this critical area. Incidently, it will be noted that the small end of the plug 20, in the assembled and cable clamping arrangement, extends downwardly so as to generally terminate in the same plane as the small end of the liner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The combination of a cable having a central core with a set of strands wrapped spirally around said core, and fastening means for said cable, said fastening means comprising a frustoconical socket, an open-ended liner having an outer frustoconical surface seated in said socket and also having an inner frustoconical surface, a hollow tapered locking plug positioned about the cable core between the core and the strands for pressing the strands against the inner surface of said liner, and a tapered locking pin inserted into the cable core for wedging the same inside said hollow locking plug, said liner comprising a pair of complemental half-sections abutting each other in a plane diametric of said cable, said liner half-sections having abutting edges provided with interfitting means to prevent movement of the half-sections longitudinally of each other, the taper of the outer frustoconical surface of said liner corresponding to the taper of said frustoconical socket, and the taper of the inner frustoconical surface of the liner being less than that of the locking plug whereby a progressively greater wedging action will be effected along the length of the received strands.

2. A cable fastener for securing the end portion of a cable comprising a central core and a set of core surrounding strands, said fastener including means for engaging and wedgedly securing the strands of a cable upon the introduction of a predetermined tension thereinto, and means for subsequently independently wedgedly securing the associated core of the cable, said means for securing the strands comprising, a tapered socket, an open-ended hollow liner receivable within said socket and having an outer tapered surface conforming to said socket and also having an inner tapered surface, said liner being adapted to receive therein an end portion of a cable, and a hollow tapered locking plug receivable within said liner and adapted to be inserted about a received cable core within the strands thereof for wedging the latter against the inner surface of said liner, said means for securing the core comprising a tapered locking pin receivable within the received cable core for wedging the same inside said locking plug, said liner comprising a pair of complemental half-sections abutting each other in a plane diametric of the liner, said liner half-sections having abutting edges provided with interfitting means to prevent movement of the half-sections longitudinally of each other, the taper of the outer tapered surface of said liner corresponding to the taper of said tapered socket, and the taper of the inner tapered surface of the liner being less than that of the locking plug whereby a progressively greater wedging of received strands will be effected along the length thereof.

3. A cable fastener for securing the end portion of a cable comprising a central core and a set of core surrounding strands, said fastener including means for engaging and wedgingly securing the strands of a cable upon the introduction of a predetermined tension thereinto, and means for subsequently independently wedgedly securing the associated core of the cable, said means for securing the strands comprising a tapered socket, and open-ended hollow liner receivable within said socket and having an outer tapered surface conforming to said socket and also having an inner tapered surface, said liner being adapted to receive therein an end portion of a cable, and a hollow-tapered locking plug receivable within said liner and adapted to be inserted about a received cable core within the strands thereof for wedging the latter against the inner surface of said liner, the taper of the outer tapered surface of said liner corresponding to the taper of said tapered socket, and the taper of the inner tapered surface of the liner being less than the taper of the outer surface of the locking plug whereby a progressively greater wedging of received strands will be effected along the length thereof between the liner and the locking plug, said means for securing the core comprising a tapered locking pin receivable within the cable core within the locking plug for wedging the core against the inside of said locking plug independently of the wedging of the strands between the locking plug and the liner.

4. The device of claim 3 wherein the inner surface of the hollow locking plug is tapered inwardly from the wide end of said plug so as to substantially conform to the taper of the locking pin and, from a depth approximately equal to the length of the locking pin, is cylindrical through the small end of the locking plug.

References Cited

UNITED STATES PATENTS

| | | | |
|---|---|---|---|
| 1,466,127 | 8/1923 | Gottschalt | 24—122.6 |
| 1,863,021 | 6/1932 | Matthes | 24—126 X |
| 1,886,247 | 11/1932 | Cole | 24—122.6 X |
| 2,538,043 | 1/1951 | Roy | 24—114.5 |
| 2,856,662 | 10/1958 | Clark | 24—122.6 |
| 3,249,908 | 5/1966 | Fuller. | |

FOREIGN PATENTS

| | | |
|---|---|---|
| 784,420 | 7/1935 | France. |
| 14,869 | 12/1885 | Great Britain. |
| 941,381 | 11/1963 | Great Britain. |

BERNARD A. GELAK, Primary Examiner

U.S. Cl. X.R.

24—126